Oct. 2, 1951  H. J. HALL  2,569,605
RECTIFIER SYSTEM CONTROL
Filed Jan. 19, 1950  2 Sheets-Sheet 1

INVENTOR
HERBERT J. HALL
BY Stowell & Evans
ATTORNEYS

INVENTOR
HERBERT J. HALL

BY Stowell & Evans

ATTORNEYS

Patented Oct. 2, 1951

2,569,605

UNITED STATES PATENT OFFICE 2,569,605

RECTIFIER SYSTEM CONTROL

Herbert J. Hall, Princeton, N. J., assignor to Research Corporation, New York, N. Y., a corporation of New York Application January 19, 1950, Serial No. 139,519

11 Claims. (Cl. 315—107)

This invention relates to rectifier system control and more particularly to a device and a method for automatically regulating the heater or filament voltage in accordance with variations in the output current of a rectifier system employing a hot cathode electron tube, more especially a vacuum tube diode having a tungsten or similar metallic filament cathode.

A principal object of the invention is to provide in a rectifier system of the foregoing type a control device that continuously adjusts the filament temperature to the lowest practicable operating level and thereby promotes maximum service life of the tube or tubes.

Another object is to provide a control device for vacuum tube rectifiers that has no moving parts, that requires little or no servicing, that is simple in construction and readily adaptable to use in pre-existing rectifier systems, that is relatively inexpensive, that is reliable in operation, that may be designed for a wide variety of applications, and that is especially suited to the control of power supplies for electrical precipitation equipment.

Another object is to provide a method of operating vacuum tube rectifiers that insures maximum tube life.

The foregoing and other objects of the invention, as may appear hereinafter, are attained in a rectifier system including an electron rectifier tube having a cathode and an anode, means for heating the cathode including a transformer having a secondary winding connected to supply heating current to the cathode and a primary winding, and control means including a saturable reactor and circuit elements positioned to subject the core of the reactor to variations in the rectifier output current and circuit elements connecting the reactor with the transformer circuit to regulate the voltage applied to the primary winding of the transformer in response to variations in the rectifier output current.

Figure 1:
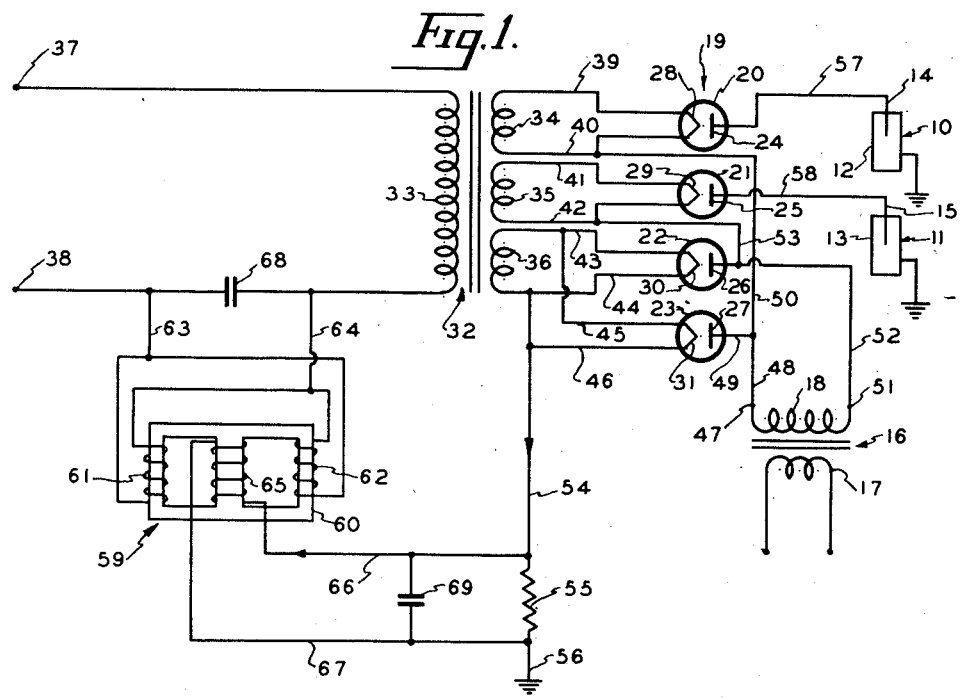
Fig. 1 is a diagrammatic view of an electrical precipitation system including a bridge rectifier utilizing vacuum rectifying tubes and showing one form of rectifier control device in accordance with the invention.

Referring to the drawings, particularly to Fig. 1, the electrical precipitation system shown includes two precipitators designated by the general reference numerals 10 and 11. The precipitators, which are conventional, may be identical and each has the usual collecting electrode 12 or 13 which may be in the form of an electrically grounded vertical tube through which gas to be cleaned is passed in a vertical direction, and a discharge electrode 14 or 15 positioned centrally of the tube and electrically insulated from the tube.

In operation, a high electric potential is maintained between the discharge and collecting electrodes. Corona discharge occurs at the discharge electrode and a strong electric field exists in the space between the discharge and collecting electrodes. Gas bearing suspended matter is passed between the discharge and collecting electrodes and the suspended particles are charged, attracted to the collecting electrodes and deposited upon the latter; the gas then leaves the precipitator substantially free from suspended matter.

The power supply for maintaining the requisite potential between the complementary electrodes of the precipitators includes a step-up power transformer 16 having a primary winding 17 supplied, for example, with line alternating current and a secondary winding 18 supplying current of the high voltage necessary to energize the precipitators.

The current from the power transformer secondary is rectified in a vacuum tube bridge rectifier 19 having four tubes 20, 21, 22 and 23. The tubes shown are vacuum diodes having plate electrodes or anodes 24, 25, 26, and 27, respectively, and opposed cathodes 28, 29, 30, and 31. The cathodes are substantially pure tungsten filaments that emit electrons upon being heated to an appropriate temperature.

The cathodes are heated by alternating current supplied by a filament or heating transformer 32 having a primary winding 33 supplied preferably from a stabilized line voltage and three secondary windings 34, 35, and 36. The primary winding 33 is connected to the line at terminals 37 and 38. Secondary winding 34 is connected to the filament 28 of tube 20 through conductors 39 and 40; similarly secondary winding 35 is connected through conductors 41 and 42 to the cathode 29 of tube 21. The filaments of tubes 22 and 23 are connected in parallel to the secondary winding 36 of the filament transformer; the filament 30 being thus connected through wires 43 and 44 and the filament 31 through wires 45 and 46.

Current from one end 47 of the power transformer is carried to the rectifier bridge through conductor 48 that makes connection with the anode 27 of tube 23 through a wire 49 and also with the cathode 28 of tube 20 through a wire 50. The other end 51 of the power transformer has a conductor 52 leading to the anode 26 of tube 22 and through a branch conductor 53 to the cathode 29 of tube 21. This constitutes the input system of the bridge rectifier.

The output system of the rectifier includes the conductor 54 that is connected to the cathodes 30 and 31 of the tubes 22 and 23 and a series resistor 55 that is grounded at one end through the cable 56. The anode 24 of the tube 20 is connected to the discharge electrode 14 of precipitator 10 by a cable 57 and the anode 25 of tube 21 is similarly connected to the discharge electrode 15 of precipitator 11 by a cable 58.

It will thus be seen that the precipitators form a load for the power supply and that the discharge electrodes of the precipitators are charged from the rectifier with alternate half waves of the same polarity. Of course, the anodes 24 and 25 could be connected together externally of the tubes to provide full wave rectified current for any suitable load. It will be seen that the return circuit from the load to the rectifier is through ground.

In the operation of electrical precipitators, the electric power demand may vary from peak to from 5% to 25% or more below peak in the daily cycle, and operation at any particular load may extend over a period of several hours. In accordance with the invention, the filaments of the rectifier tubes are supplied with heating voltages slightly more than sufficient to provide by evaporation the minimum number or quantity of electrons required to carry the load current across the tubes for the particular power demand existing at the time. Since, as pointed out, the power demand varies, the invention provides a control device for automatically varying the filament heating voltage in accordance with variations in the power demand.

The control device shown by way of example in Fig. 1 has a saturable reactor 59 having a three-legged core 60. On the outer legs of the core are wrapped alternating current windings 61 and 62 that are connected in parallel with each other and in series with the primary winding of the filament transformer 32 by the wires 63 and 64. A direct current or control winding 65 is wrapped on the center leg of the core and connected by wires 66 and 67 across the resistor 55, the latter being in series with the rectifier output circuit. If desired, a condenser 68 is connected across the terminals of the saturable reactor 59 for the purpose of retarding the action of the reactor. A condenser 69 may be connected in parallel with the resistor 55 to minimize the effect of transients that may arise in the rectifier output circuit.

Figure 5:
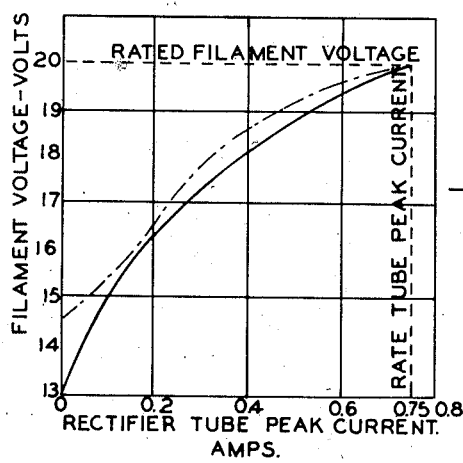
Fig. 5 is a graph showing typical relationships between filament voltage and peak current for a tungsten filament rectifier tube.

In Fig. 5, which is a chart or graph showing the relationship between filament voltage and rectifier tube peak current for a typical tungsten filament rectifier tube, the solid line denotes the tube characteristic and the broken line shows the degree of control exercised by one control device in accordance with the invention.

Considering the solid line, it will be seen that a threshold heating voltage of slightly more than 13 volts must be applied to the filament in order for the tube to conduct any current at the operating plate voltage. At about 18 volts across the filament, the tube will carry a peak current of about 0.4 amp. At the rated filament voltage of 20 volts, the rated tube peak current of 0.75 amp. flows. It will be seen that the filament voltage must be increased as the peak current carried by the tube increases and that, in the operating range represented by the graph, the increase in filament voltage is roughly proportional to the increase in peak tube current.

Referring to the broken line curve of Fig. 5, it will be seen that the control device of the invention is designed and related to the rectifier system in such manner that a filament voltage of about 14.5 volts is maintained under no-load conditions. At an output load current of 0.4 amp. from the rectifier, the control device permits a voltage of about 18.5 volts to be applied across the filament. At the peak rated current demand of 0.75 amp., the filament voltage rises to the rated value of 20 volts. The tube filament voltage is thus regulated in accordance with variations in the load current to provide filament temperature slightly more than adequate to meet the load requirements.

Design characteristics of the saturable reactor 59 necessary to accomplish the results of the invention will be apparent to those skilled in the art. The impedance of the reactor is such that when no current is flowing in the output circuit of the rectifier, the impedance offered by the reactor is sufficient to provide substantially threshold voltage across the tube filaments. The value of the resistor 55, the nature of the core material, the core design, and the number of turns in the coils 61, 62, and 65 are such that the impedance of the reactor is lowered in the requisite relation to the rectifier output current to maintain whatever increased filament voltage is required for values of load current up to normal peak operating conditions.

Figure 2:
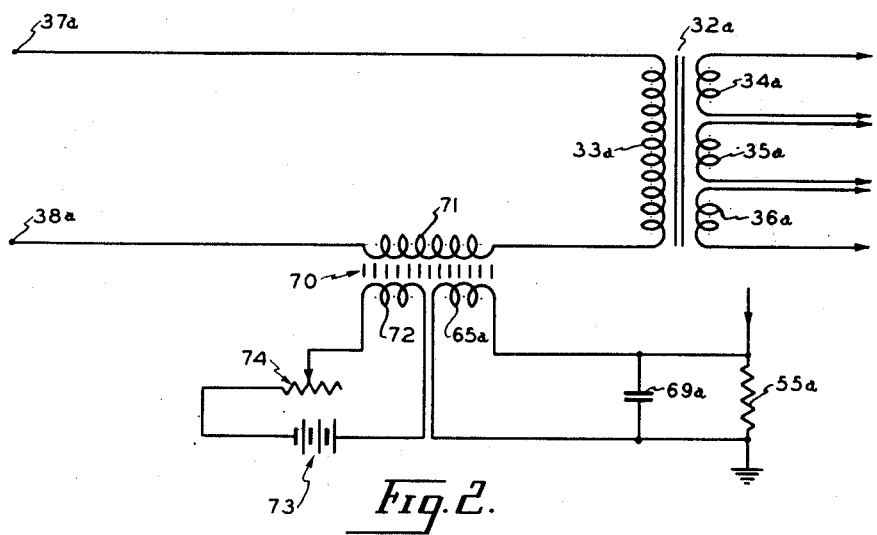
Fig. 2 is a diagrammatic view of another form of control device including an independent excitor for the saturable reactor.

It has been found that certain economics, particularly in the core loss and in the amount of steel required for the core of the saturable reactor, may be effected if the reactor is provided with independent excitation. Fig. 2 shows diagrammatically one mode of accomplishing this.

Referring to Fig. 2 the filament transformer is designated 32a. It has a primary winding 33a and filament windings 34a, 35a, and 36a. The divider resistor in the rectifier output circuit is numbered 55a. A saturable inductor 70 has its controlled winding 71 in series with the filament transformer primary winding. Independent excitation is provided by an auxiliary control winding 72 supplied with direct current from a suitable source designated as battery 73 connected through a variable resistor 74 to the terminals of the auxiliary winding. The auxiliary control winding is energized to provide threshold filament voltage with no rectifier output. The control winding 65a responds to variations in output current to increase the filament voltage as required by increased load current.

Figure 3:
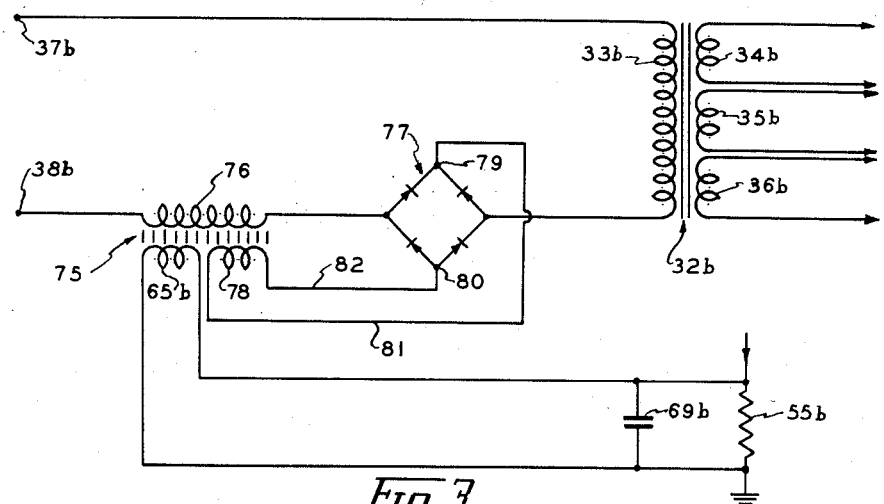
Fig. 3 is a diagrammatic view of another form of control device employing self-excitation of the saturable reactor.

As shown in Fig. 3, the battery 73 of Fig. 2 may be eliminated while retaining the advantages of supplemental reactor excitation, by providing a self-excited system.

In Figs. 3, reference numerals with the subscript b designate parts corresponding to those referred to in Fig. 1 by similar numerals without the subscript.

A saturable reactor 75 has its controlled winding 76 in one of the two wires carrying alternating current to the primary winding 33b of the filament transformer 32b. Also included in the primary circuit of the filament transformer is a bridge rectifier designated by the general reference numeral 77. This rectifier may consist of four selenium rectifier elements inter-connected as shown. A feed-back circuit including the auxiliary control coil 78 of the reactor is connected to the output terminals 79 and 80 of the rectifier 77 by wires 81 and 82. The auxiliary control coil is designed in relation to the other elements of the system to partially saturate the reactor core thus allowing threshold voltage to be supplied to the tube filaments under no-load conditions. It will be understood that the main control coil 65b serves to further reduce the impedance of the reactor 75 as the rectifier load is increased to provide the requisite voltage across the rectifier tube filaments.

Figure 4:
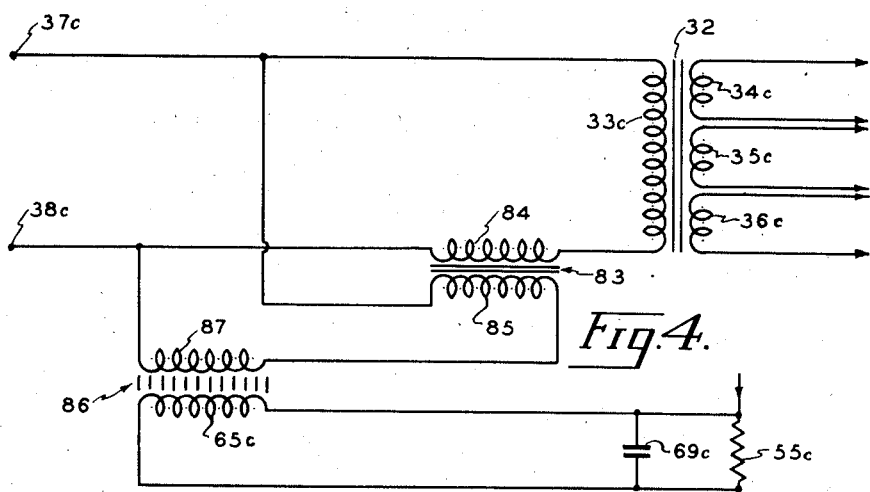
Fig. 4 is a diagrammatic view of still another form of control device in accordance with the invention.

The form of the invention shown in Fig. 4 utilizes principles developed in the description of the systems of Figs. 1 to 3. In the control system of Fig. 4, there is provided a booster transformer 83, the secondary winding 84 of which is connected in series with the primary winding 33c of the filament transformer. Alternating current voltage is applied to the primary winding 85 of the booster transformer from the current source that supplies the filament transformer, and the magnitude of the voltage is controlled by a saturable reactor 86. This reactor has its controlled winding 87 connected in series with the primary winding 85 of the booster transformer and its control winding 65c is energized by direct current drawn from across the dividing resistor 55c in the rectifier return circuit. A condenser 69c may be connected in parallel with the resistor 55c, if desired.

In the control device of Fig. 4, the power rating of the saturable reactor is about one-quarter of that required to perform an equivalent function in the device of Fig. 1; thus the weight and cost are substantially lower. The control system of Fig. 4 does not require the use of an auxiliary D. C. supply and has a good overall power factor in the rectifier tube filament supply system.

Although rectifier tubes having directly heated cathodes have been referred to herein by way of illustration, it will be apparent that tubes having indirectly heated cathodes may also be employed. While tungsten cathode tubes are preferred, tubes having similar filament characteristics may be used.

The advantages of the invention are realized in single-tube as well as multi-tube rectifiers.

Modifications of the invention will occur to those skilled in the art in the light of the foregoing description which are within the spirit and scope of the invention as defined in the claims.

I claim:

1. In a rectifier system including an electron rectifier tube having a cathode and an anode, means for heating the cathode including a transformer having a secondary winding connected to supply heating current to the cathode and a primary winding, control means comprising a saturable reactor, circuit elements positioned to subject the core of said reactor to variations in the rectifier output current, and circuit elements connecting said reactor with said transformer circuit to regulate the voltage applied to said primary winding of said transformer in response to variations in the rectifier output current.

2. In a rectifier system including an electron rectifier tube having a metallic filament cathode and an anode, means for heating the cathode including a transformer having a secondary winding connected to supply heating current to the cathode and a primary winding, control means comprising a saturable reactor, circuit elements positioned to subject the core of said reactor to variations in the rectifier output current, and circuit elements connecting said reactor with said transformer circuit to regulate the voltage applied to said primary winding of said transformer in response to variations in the rectifier output current.

3. In a rectifier system including an electron rectifier tube having a tungsten filament cathode and an anode, means for heating the cathode including a transformer having a secondary winding connected to supply heating current to the cathode and a primary winding, control means comprising a saturable reactor, circuit elements positioned to subject the core of said reactor to variations in the rectifier output current, and circuit elements connecting said reactor with said transformer circuit to regulate the voltage applied to said primary winding of said transformer in response to variations in the rectifier output current.

4. In a rectifier system including a bridge-connected electron tube rectifier, the tubes of said rectifier each having an anode and a tungsten filament cathode, means for heating the cathodes of said tubes including a filament transformer having a primary winding and a plurality of secondary windings, said secondary windings being connected to supply heating current to the filament cathodes of said tubes, control means comprising a saturable reactor having a control winding and a controlled winding, circuit elements connected to supply a definite proportion of the rectifier output current to said control winding, and circuit elements connecting the controlled winding of said reactor in series with the primary winding of said transformer.

5. In a rectifier system including a bridge-connected electron tube rectifier, the tubes of said rectifier each having an anode and a tungsten filament cathode, means for heating the cathodes of said tubes including a filament transformer having a primary winding and a plurality of secondary windings, said secondary windings being connected to supply heating current to the filament cathodes of said tubes, control means comprising a saturable reactor having a controlled winding, a main control winding and an auxiliary control winding, circuit elements connected to supply a definite proportion of the rectifier output current to said main control winding, means connecting said auxiliary control winding to an independent source of direct current, and circuit elements connecting the controlled winding of said reactor in series with the primary winding of said transformer.

6. In a rectifier system including a bridge-connected electron tube rectifier, the tubes of said rectifier each having an anode and a tungsten filament cathode, means for heating the cathodes of said tubes including a filament transformer having a primary winding and a plurality of secondary windings, said secondary windings being connected to supply heating current to the filament cathodes of said tubes, control means comprising a saturable reactor having a controlled winding, a main control winding and an auxiliary control winding, circuit elements connected to supply a definite proportion of the rectifier output current to said main control winding, current rectifying means in the primary circuit of said transformer, circuit elements connecting the output of said current rectifying means to said auxiliary control winding, and circuit elements connecting the controlled winding of said reactor in series with the primary winding of said transformer.

7. In a rectifier system including a bridge-connected electron tube rectifier, the tubes of said rectifier each having an anode and a tungsten filament cathode, means for heating the cathodes of said tubes including a filament transformer having a primary winding and a plurality of secondary windings, said secondary windings being connected to supply heating current to the filament cathodes of said tubes, control means comprising a booster transformer having a primary winding and a secondary winding, circuit elements connecting the secondary winding of said booster transformer in series with the primary winding of said filament transformer, a saturable reactor having a controlled winding and a control winding, circuit elements connecting the controlled winding of said saturable reactor in series with the primary winding of said booster transformer, circuit elements connecting said series connected booster transformer and reactor windings in parallel with said series connected booster transformer and filament transformer windings, and circuit elements connected to supply a definite proportion of the rectifier output current to the control winding of said saturable reactor.

8. In a rectifier system as defined in claim 1, said circuit elements positioned to subject the core of said reactor to variations in the rectifier output current comprising a resistor in the output circuit of the rectifier, a control coil on the core of said reactor, and conductor means connecting said control coil in parallel with said resistor.

9. In a rectifier system as defined in claim 1, said circuit elements positioned to subject the core of said reactor to variations in the rectifier output current comprising a resistor in the output circuit of the rectifier, a control coil on the core of said reactor, a condenser, and conductor means connecting said resistor, said control coil and said condenser in parallel.

10. In a rectifier system including an electron rectifier tube having a cathode and an anode, means for heating the cathode including a transformer having a secondary winding connected to supply heating current to the cathode and a primary winding, control means comprising a saturable reactor having a direct current control winding and an alternating current controlled winding, means including circuit elements energizing the control winding of said reactor with direct current proportional to the rectifier output current, and circuit elements coupling the controlled winding of said reactor with the primary circuit of said transformer to regulate the voltage applied to the primary winding of said transformer in response to variations in the rectifier output current.

11. A method of controlling the operation of an electron tube rectifier system subject to varying load demands and including a cethode in the tube heated by alternating current which comprises, applying an alternating current potential to the cathode heating element of the tube, sensing the output current of the rectifying system, and varying the inductance of the cathode heating circuit in accordance with variations in the rectifier output current to provide electron emission from the tube cathode that is substantially the minimum required to carry the output current through the tube.

HERBERT J. HALL.

REFERENCES CITED

The following references are of record in the file of this patent:

UNITED STATES PATENTS

| Number | Name | Date |
|---|---|---|
| 1,654,948 | Thompson | Jan. 3, 1928 |
| 2,278,151 | Runaldue | Mar. 31, 1942 |
| 2,322,130 | Hedding | June 15, 1943 |
| 2,404,905 | Garretson | July 30, 1946 |
| 2,431,311 | Cronvall | Nov. 25, 1947 |
| 2,431,902 | Albin | Dec. 2, 1947 |
| 2,453,960 | Arvidsson | Nov. 16, 1948 |